April 10, 1956     A. W. W. CAMERON     2,741,739

ELECTRICAL MEASURING APPARATUS FOR TESTING INSULATION

Filed Dec. 13, 1951     2 Sheets-Sheet 1

INVENTOR
A W W. CAMERON

ATTY

April 10, 1956 A. W. W. CAMERON 2,741,739
ELECTRICAL MEASURING APPARATUS FOR TESTING INSULATION
Filed Dec. 13, 1951 2 Sheets-Sheet 2

Fig. 1.ᵃ

INVENTOR
A.W.W. CAMERON
ATTY

United States Patent Office 2,741,739
Patented Apr. 10, 1956

2,741,739

ELECTRICAL MEASURING APPARATUS FOR TESTING INSULATION

Archibald William Wales Cameron, North York Township, Ontario, Canada

Application December 13, 1951, Serial No. 261,534

15 Claims. (Cl. 324—54)

This invention relates to electrical measuring apparatus, and more particularly to apparatus for testing the quality of insulation.

Every electrical apparatus requires insulation to confine electric currents to the conducting paths designed for them. The insulation and the adjoining conducting members form electric condensers, and when an alternating voltage is applied the condensers draw charging current. Also, some leakage current flows through the insulation. These currents cause a certain loss of power, and consequently the power factor of the applied voltage and the resultant current is other than zero.

It has long been known that measurements of current and power or power factor are of value in indicating the soundness of new insulation and the state of deterioration of insulation which has been in service, and numerous devices have been evolved to make such measurements. However, difficulty has been experienced in obtaining accurate measurements, due to external electrostatic interference and to currents and power losses arising in the test equipment itself and not in the insulation under test. Many of the known devices are expensive and cumbersome.

It is accordingly an object of this invention to devise an apparatus for measuring power factor and current of electrical insulation which will yield highly accurate measurements over the whole range of capacitances and power factors normally encountered, and which may be operated over considerable ranges of voltage and frequency.

It is another object of this invention to devise an electrical measuring apparatus which is small, light, inexpensive, and provides the operator with a high degree of safety.

It is still another object of this invention to devise an electrical measuring apparatus which can safely be used in the high tension side of a test circuit and can quickly be connected to the test specimen in the field.

It is a further object of this invention to devise novel circuits for the measurement of electrical qualities of insulation.

In the embodiment of the invention described hereinafter in detail, measuring means are enclosed in an inner and an outer box, screen or shield, hereinafter called closures, and the closures are electrically insulated from each other and form a capacitor. The measuring means within the closures is connected to the high tension side of a voltage supply and to one terminal of the test specimen, and another terminal of the test specimen is grounded. The outer closure is also grounded. The closures screen the measuring means from electrostatic interference and protect the operator from the high potential of the measuring means when connected to the voltage source, and the measuring means utilizes the capacitance between the closures as part of the measuring circuit. The measuring means comprises impedance elements, preferably resistors, and a meter connected in a bridge network. In the four-arm bridge described herein, two arms of the bridge include resistors, a third arm includes the capacitor formed by the closures, and the fourth arm includes the test specimen. The meter, which is connectible across portions of the resistors, is indicative of a difference in potential created by the current flowing through the test specimen and by a reference current drawn by the measuring circuit, and the resistors may be varied to obtain indication on the meter, current and power factor then being read on calibrated dials associated with the resistors.

As will be explained hereinafter, power factor may conveniently be measured by obtaining a minimum reading on the meter, or in other words by minimizing the indicated difference. According to the invention, the reference current is varied in phase, to obtain a minimum indication, by varying an impedance inserted between the closures. One satisfactory construction comprises a conductive member supported between the closures and electrically insulated therefrom but connected to one of the closures through a variable resistor.

Where leakage currents arising in the measuring apparatus may cause errors in the measurements, means may be provided for supplying the leakage currents directly so that they do not flow through the measuring means. Thus, dielectric structures through which leakage currents flow may be connected directly to the voltage source by means of shunts. Controls for the measuring means within the closures must extend through the closures, and are made as long as possible to minimize leakage currents through them. These controls may also have shunts to divert their leakage currents from the measuring means.

The invention is more particularly described with reference to the accompanying drawings in which like reference characters indicate corresponding parts throughout the several views, and in which:

Fig. 1a is a diagrammatic fragmentary sectional view showing a modification of the embodiment shown in Fig. 1;

Figure 1:
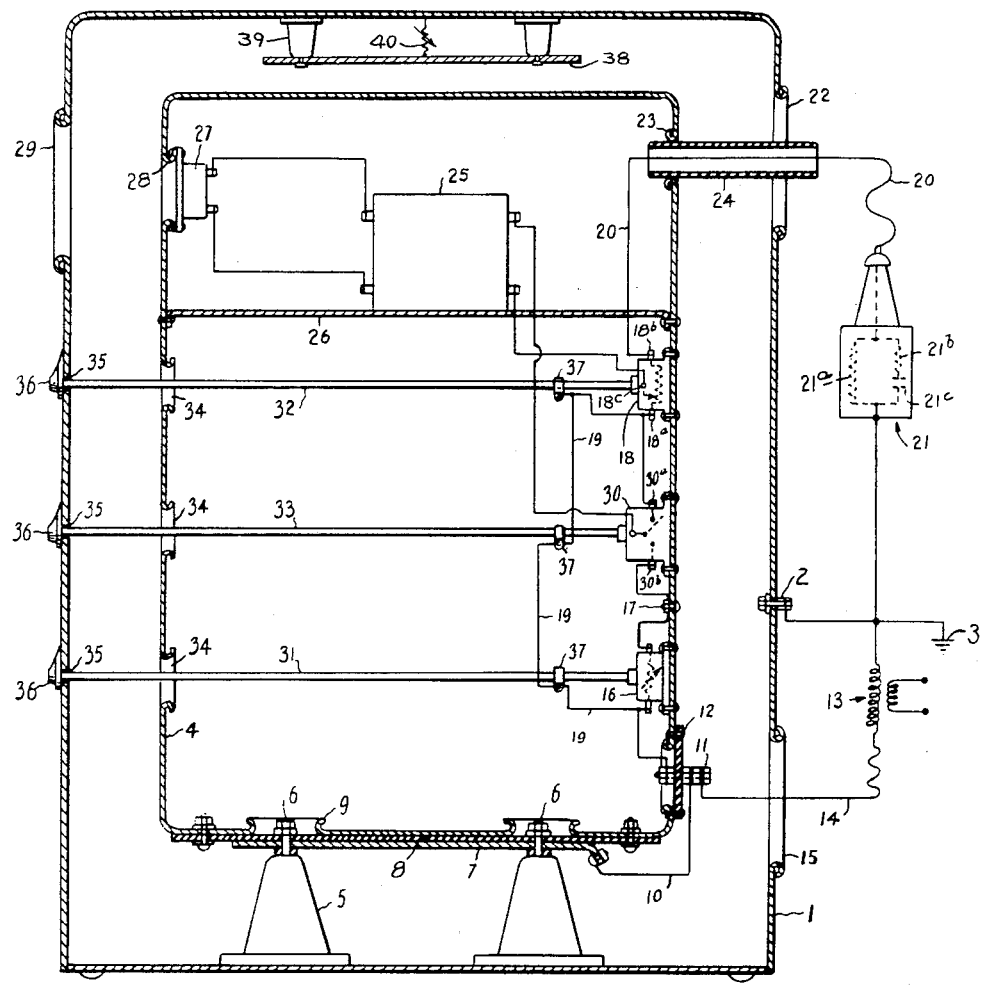
Fig. 1 is a diagrammatic sectional view of one embodiment of the invention.
Figure 2:
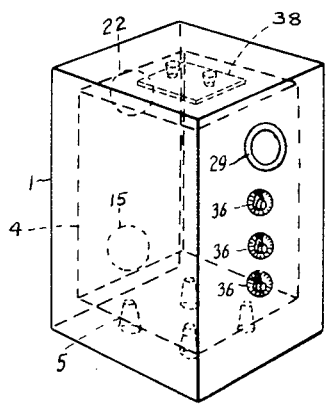
Fig. 2 is a perspective view on a smaller scale showing the general construction of the embodiment shown in Fig. 1.

The apparatus illustrated in Fig. 1 comprises an outer metal box which forms a conductive closure 1 having a terminal 2 connected to ground 3. Within the closure 1, an inner metal box which forms a conductive closure 4 is supported on four insulators 5 of porcelain or other material. The two closures form the electrodes of a capacitor, and the air space between them is so dimensioned that at all voltages at which the apparatus is to be used there is negligible power loss. Also, sharp corners and other projections which might cause corona loss are avoided.

The insulators 5 have pins 6 connected to a conductive strip 7. The pins 6 and strip 7 are insulated from the inner closure by a strip 8 of Bakelite or other insulating material. The strip 8 is bolted to the inner closure, but the pins 6 pass through openings 9 in the closure. The conductive strip 7 is connected by a shunt 10 to a terminal 11 mounted on but insulated from the inner closure by means of an insulated support 12 which need withstand only a few volts. The terminal 11 is connected by an unshielded line 14 to one side of an alternating voltage source, such as a transformer 13, capable of supplying a potential of the order of 10,000 volts. The other side of the source is grounded. The line 14 is brought through the outer closure 1 in any manner that will safely insulate it from the outer closure at the maximum desired voltage, and in the embodiment shown the line is brought in through a wide opening 15 in the outer closure.

A conductive member, which may suitably take the form of a metal plate 38, is supported on insulators 39 at a suitable distance from the inner closure 4 having regard to the supply voltages to be used, and is connected to the outer closure 1 through a variable resistor 40. To minimize the capacitance $C_1$ between the plate 38 and the outer closure 1, the distance between them is made as large as is practicable; alternatively, as shown in Fig. 1a, an extension 4a of the inner closure 4 may be built around the plate 38 thus increasing the capacitance between the inner closure and the plate and substantially eliminating capacitance between the plate and the outer closure, since the extension electrostatically shields the plate from the outer closure. In the alternative construction shown in Fig. 1a, the plate 38 may be supported by stand-off insulators 39 mounted on the outer closure 1. For some purposes, such as operation on the lower power frequencies like 25 cycles per second it may be advantageous to extend the plate 38 and the extension 4a around other or all sides of the inner closure 4, or to use a plurality of such plates and extensions.

Measuring means, at substantially the same potential as the inner closure, are connected in a bridge network within the inner closure. One arm of the bridge, which is shown schematically in Fig. 3, consists of a variable resistor 16 supported within the inner closure and connected between the terminal 11 and a terminal 17 connected to the inner closure 4. A second arm of the bridge is the largely capacitive impedance between the closures, consisting substantially of the capacitance $C_0$ between the inner and outer closures 4 and 1 in those parts not affected by the interposed member 38, the capacitance $C_1$ between the member 38 and the outer closure 1, the capacitance C between the member 38 and the inner closure 4, and the resistance R at which the variable resistor 40 is set at the moment under consideration. A third arm of the bridge consists of a potentiometer 18 supported within the inner closure and connected at one side $18^a$ by leads 19 to the terminal 11 and connected at the other side $18^b$ by a short lead 20 to an ungrounded terminal of the specimen 21 which is to be tested. The lead 20 is brought out from the closures through a large opening 22 in the outer closure 1 and a smaller opening 23 in the inner closure 4. The lead 20 need only be insulated for a low voltage at the point of exit from the inner closure, and it is convenient to fit a tube 24, of varnished paper or like insulating material, into the opening 23 and surrounding the lead 20 to support it away from the metal of the outer closure 1. The lead 20 may consist of an unshielded flexible conductor. The fourth arm of the bridge consists of the specimen 21, which may be, for example, the bushing of an oil circuit breaker. The specimen is indicated conventionally as a resistor $21^a$ connected in parallel with a series connected resistor $21^b$ and capacitor $21^c$. One terminal of the specimen is grounded.

Within the inner closure, a battery-operated vacuum-tube voltmeter 25 is supported on a bracket 26 and has an indicating instrument 27 mounted in a window 28 in the inner closure. A larger window is provided in the outer closure. Although it is not necessary if the window 29 is considerably larger than the window 28, glass containing metal wire mesh may be placed in the window 28, the mesh being connected to the metal of the inner closure so that electrostatic attraction from the outer closure is screened. The vacuum-tube voltmeter forms part of the measuring means connected in the bridge network. It is of reasonably small physical size and, in accordance with good general practice, has a high input, impedance, and may conveniently be provided with a gain control and switching means for varying the proportion of the available potential which is applied to it. One side of the vacuum-tube voltmeter is connected to the movable arm $18^c$ of the potentiometer 18 and the other side of the meter is connected to the pole of a single pole double-throw switch 30. One contact $30^a$ of the switch is connected to the side $18^a$ of the resistor 18, and the other contact $30^b$ is connected to the terminal 17 on the inner closure 4.

As controls for the variable resistor 16 and the potentiometer 18 and for the switch 30, operating rods 31, 32 and 33 respectively are provided, passing through openings 34 in the inner closure 4 and openings 35 in the outer closure. The rods are constructed of low-loss insulating material such as ebonite, and are furnished with handles or dials 36. A similar operating rod and dial may be provided for the resistor 40. The openings 34 in the inner closure are large in proportion to the diameter of the rods, the actual size depending on the magnitude of the supply voltage, while the openings 35 in the outer closure need only be sufficiently large to permit easy movement of the rods. In order to ensure that leakage currents and power losses in the rods are reduced to values which are too small to have an appreciable effect on the measurements, the resistors 16 and 18 and the switch 30 are mounted at one side of the inner closure and the openings through which the rods pass are located at the opposite side of the closures so that the rods extend substantially across the inner closure and the leakage paths along the rods are of maximum length. In addition, or alternatively, a conducting collar 37 may be provided on each rod at a suitable distance, commensurate with the supply voltage, from the outer closure, each collar being connected through the leads or shunts 19 to the supply terminal 11. Thus, leakage and losses of the operating rods are supplied directly to the rods from the supply without affecting other parts of the circuit. Similarly, leakage current of the capacitor through the insulators 5 is directly supplied from the terminal 11 through the shunt 10 which by-passes the measuring means, the leakage current thus being diverted from the measuring means.

In order to adjust other parts of the measuring means, suitable lids or hatches may be provided in the closures for access to the interior of the closures when the voltage supply is safely removed.

Figure 4:
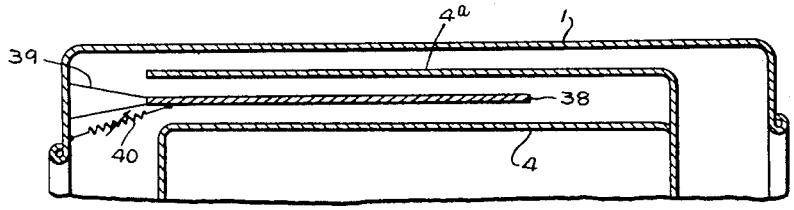
Fig. 4 is a vector diagram for explaining the operation of the embodiment shown in Fig. 1.
Figure 4:
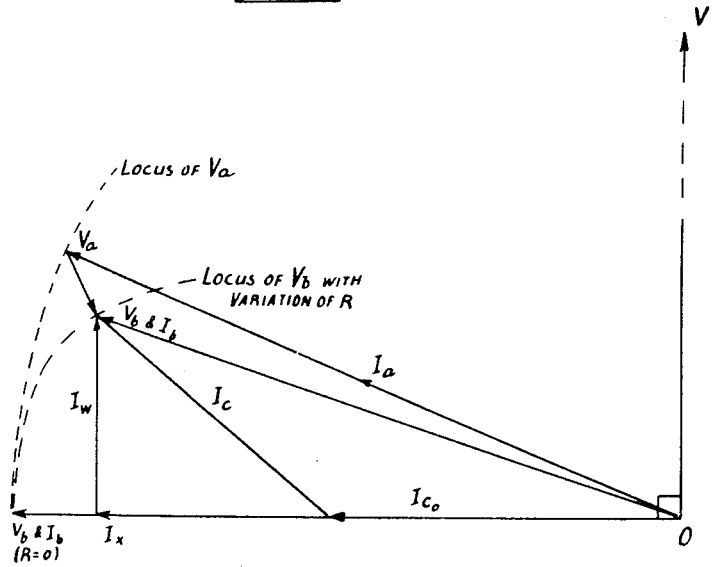

In the vector diagram shown in Fig. 4, the supply voltage between the terminal 11 and ground is represented by the vector $OV$ which is broken since it is much larger than the other voltage vectors. A current $I_a$ flows from the terminal 11 through the resistor 18 and the test specimen 21 and is advanced in phase less than 90 electrical degrees with respect to $OV$ because of power losses in the specimen. A current $I_b$, hereinafter called the reference current, flows from the terminal 11, through the resistor 16, and to ground through the capacitances $C_0$, $C_1$, and C and the resistor 40. The reference current has a capacitive component $I_x$ as well as a power component $I_w$ due to the resistor 40, so that the reference current $I_b$ leads the voltage $OV$ by less than 90 degrees. The voltages $OVa$ and $OVb$ which appear across the resistors 18 and 16 respectively are in phase with their respective currents $I_a$ and $I_b$.

The first step in preparation for operation is to adjust the value of the resistor 16, so that, with the resistor 40 set at zero resistance, and the desired supply voltage $OV$ applied, the current $I_b$ in the resistor 16 and in the capacitance between the inner closure 4 and ground produces a chosen standard potential difference, for example 1 volt, across the resistor 16; resistor 16 is then left fixed in adjustment.

The operating dial of the potentiometer 18 is calibrated in current values for various positions of the variable arm $18c$, so that for each position of the arm the current value indicated, when flowing between the terminals 18a and 18b, produces a potential difference between the terminal 18a and the variable arm 18c, equal to the chosen standard potential difference (for example 1 volt) referred to above in connection with adjustment of the resistor 16. Immediately before carrying out measurements on a specimen, the vacuum-tube voltmeter 25 may be calibrated by moving the switch 30 to the contact 30b, the potentiometer arm 18c to the terminal 18a, and the resistor 40 to zero resistance, and applying the desired supply voltage OV. The chosen standard potential difference will then appear across the terminals of the vacuum-tube voltmeter. The reading of the voltmeter may be noted, or better still, if the voltmeter is provided with a gain adjustment, as is usual, it may be set so that the reading is full-scale.

In making measurements on a specimen, the magnitude of the current taken by it at the desired supply voltage is measured by first moving the switch 30 to contact 30a and then moving the potentiometer variable arm 18c until the voltmeter 25 indicates the standard potential abovementioned. The current may then be read from the calibrated dial of the potentiometer 18.

To measure the power factor of the specimen current, the potentiometer 18 is left adjusted as described above, and the switch 30 is moved to contact 30b. The resistor 40 is then adjusted until a minimum reading is obtained, and power factor is then indicated by the position of the dial controlling the resistor 40.

Figure 3:
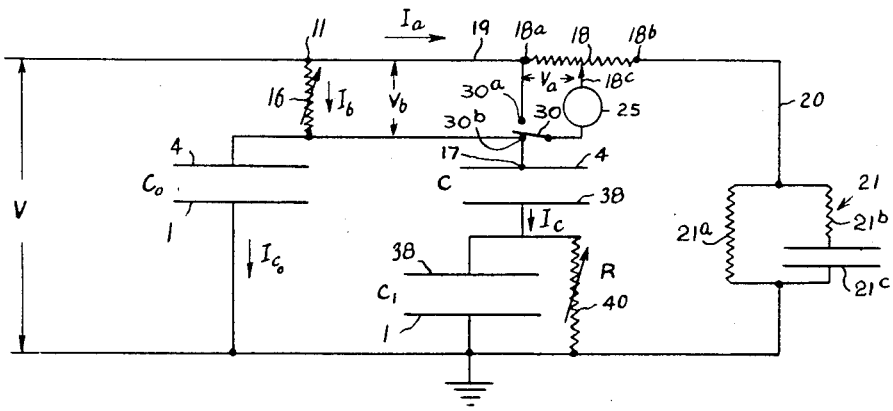
Fig. 3 is a schematic circuit diagram of the embodiment shown in Fig. 1, omitting the shunts for leakage currents.

The operation may be understood by reference to the vector diagram Fig. 4 and the schematic diagram Fig. 3.

In Figs. 3 and 4, OV is the supply voltage, the frequency of which corresponds to an electrical angular velocity $\omega$. For clarity in the drawings, the vector $Ib$ is drawn the same length as the vector $OVb$. The current $Ib$ is the vector sum of the current $I_{co}$ in capacitance $C_o$, and $I_c$ in capacitance $C$. The current $Ia$ taken by the specimen 21 flows through the potentiometer 18 and develops the standard potential $OVa$ across the portion 18a—18c thereof.

In Fig. 4, $I_{co}$ is constant for constant supply voltage OV and leads OV by substantially 90 degrees. Mathematically it can be shown that the magnitude of $I_c$ is given by $$I_c = V\omega C \sqrt{\frac{1+\omega^2 C_1^2 R^2}{1+\omega^2 (C+C_1)^2 R^2}}$$

while the power component of current $I_w$ is given by $$I_w = \frac{V\omega^2 C^2 R}{1+\omega^2 (C+C_1)^2 R^2}$$

where V is the magnitude of the voltage vector OV.

These formulae show that, as R increases, $I_c$ and therefore also $OVb$ decreases in magnitude and follow a noncircular locus.

For a given power factor of the specimen current $Ia$ the voltage vector $OVa$ which is of constant magnitude, terminates at a point $Va$ on a circular locus having the point O as centre. As R is varied, the voltage $VaVb$, which is indicated by the voltmeter 25, passes through a minimum when its vector is at right angles to a tangent to the locus of $Vb$. One value of R, for which $VaVb$ is a minimum, therefore corresponds to one value of power factor of $Ia$, and the operating dial of the resistor 40 may accordingly be calibrated to read power factor directly when $VaVb$ is minimized. The dial of resistor 40 could be calibrated by calculation from resistance and capacitance values, but it is best to calibrate it by measurement of specimens of known power factor.

The above formulae also show that the divergence of the locus of $Ic$ from circular form, and thus the minimum magnitude of $VaVb$ for a given power factor of $Ia$, decrease as the capacitance $C_1$ is decreased. Accuracy of measurement, being dependant upon a minimum value of $VaVb$, is therefore improved by decrease of the capacitance $C_1$ between the member 38 and the outer closure 1. The choice of suitable capacitance and resistance values makes possible a fairly linear power factor scale on the operating dial of the resistor 40.

Since the voltages $OVa$ and $OVb$ are in phase with the currents $Ia$ and $Ib$, and since the magnitudes of these voltages depend on the magnitudes of the currents, the voltmeter 25 may be said to be indicative of a voltage difference $VaVb$ due to differences in the currents $Ia$ and $Ib$. It has been pointed out that the resistor 40 introduces the power component $I_w$ of the current $Ib$, and the resistor 16 has of course a similar effect but its effect is negligible in comparison with that of the resistor 40. Furthermore, any retardation of the vector $Ib$ because of the resistor 16 is substantially nullified by a corresponding retardation of the vector $Ia$ due to the resistor 18.

Advantages of the embodiments illustrated are that the full-scale reading (or some other standard scale reading) and a minimum indication, the amount of which is immaterial, are the only indications required of the vacuum-tube voltmeter, which may therefore be of particularly simple, inexpensive, and compact design with no necessity for a linear scale or calibration, and that current and power-factor readings remain set on the appropriate dials at the end of a test, so that there is no need to note successive readings during the course of each test. It will be obvious to those skilled in the art that switched shunts may be provided across the potentiometer 18 to increase the current range of the apparatus, that the variable resistor 40 may be conveniently sectionalized for power-factor ranges, and that accuracy of power-factor indication may be improved by the provision of more sensitive ranges in the voltmeter 25 in addition to the range used for indication of the standard potential difference.

It will be seen that a simple, safe and reliable electrical measuring apparatus has been provided. The apparatus is light and may conveniently be placed on top of the electrical equipment which is to be tested. It may be used over considerable ranges of voltage, frequency and current. The effects of leakage currents due to the apparatus are negligible; in fact, if high quality insulators 5 are used, the shunt 10 and the strips 7 and 8 may be eliminated. The apparatus is not significantly affected by electromagnetic fields, and the closures shield the measuring means from electrostatic interference.

To counter the effects of electrostatic interference on the specimen of equipment 21 being tested, it is recommended that the equipment be disconnected at its terminals from all high voltage buswork and other exposed conductors, and that such disconnected buswork and conductors, and any portion of the equipment not under test, be grounded. These measures should be sufficient for accurate results in most cases. An inexpensive, unshielded high-voltage cable may be used as the line 14, because, at worst, electrostatic interference in the line 14 merely alters the voltage at the terminal 11 by a negligibly small amount. Thus, the measuring apparatus may be used at a considerable distance from the voltage supply. The lead 20 need not be shielded, since it offers little if any exposure to electrostatic interference additional to that inherent in the test specimen itself.

Where high electrostatic interference is suspected, the supply may be taken from alternative sources differing in phase; significant differences in readings will prove the presence of such interference, and an average may be taken as the true measurement. An even more accurate method is to use a supply having a frequency which differs considerably from that of the electrostatic interference.

It is to be understood that the forms of the invention herewith shown and described are to be taken as preferred examples of the same, and that various changes in the shape, size and arrangement of parts may be resorted to without departing from the spirit of the invention or the scope of the subjoined claims.

What I claim as my invention is:

1. Apparatus for testing the quality of insulation between a grounded terminal and a high tension terminal, comprising an inner conductive closure, a grounded outer conductive closure, an insulator supporting the inner closure within the outer closure, the closures thus forming a capacitor, a voltage source, measuring means located within the inner closure and connected between the voltage source and the high tension terminal and also connected between the voltage source and the inner closure, and a variable impedance outside the inner closure and in circuit between the inner closure and ground.

2. Apparatus for testing the quality of insulation, comprising a voltage source connected in circuit with the insulation whereby current flows through the insulation, an inner conductive closure, an outer conductive closure, an insulator supporting the inner closure within the outer closure, the closures thus forming a capacitor and being connected in circuit with the voltage source to draw reference current, an impedance outside the inner closure and in parallel with the capacitor and including a variable resistor having a conductive connection with one of the closures for varying the phase of the reference current, and measuring means located within the inner closure and indicative of a difference due to the said currents.

3. Apparatus for testing the quality of insulation, comprising an inner conductive closure, an outer conductive closure, an insulator supporting the inner closure within the outer closure, the inner and outer closures thus forming a capacitor, a variable impedance located between the closures and in parallel with the capacitor, and measuring means located within the inner closure and connected thereto and adapted to be connected to a voltage source and to the insulation.

4. Apparatus for testing the quality of insulation, comprising an inner conductive closure, an outer conductive closure, an insulator supporting the inner closure within the outer closure, the inner and outer closures thus forming a capacitor, a conductive member located between the closures and electrically insulated therefrom, a variable impedance connected between the conductive member and one of the closures, and measuring means located within the inner closure and connected in circuit with the capacitor and adapted to be connected to a voltage source and to the insulation.

5. Apparatus for testing the quality of insulation, comprising an inner conductive closure, an outer conductive closure, an insulator supporting the inner closure within the outer closure, the closures thus forming a capacitor, a conductive member located between the closures and electrically insulated therefrom, a variable resistor connected between the conductive member and the outer closure, and measuring means located within the inner closure and connected to the inner closure and adapted to be connected to a voltage source and to the insulation.

6. Measuring apparatus for testing the quality of insulation, comprising an inner condctive closure, an outer conductive closure electrically insulated from the inner closure, the inner and outer closures forming a capacitor, a conductive member located between the closures and electrically insulated therefrom, a conductive shield located between the closures to electrostatically shield said conductive member from one of the closures, a variable impedance connected between said conductive member and one of the closures, and measuring means within the inner closure connected in circuit with the capacitor and adapted to be connected to a voltage source and to the insulation.

7. Measuring apparatus for testing the quality of insulation, comprising an inner conductive closure, an outer conductive closure electrically insulated from the inner closure, the inner and outer closures forming a capacitor, a conductive member located between the closures and electrically insulated therefrom, a conductive shield connected to the inner closure and located between the closures to electrostatically shield said conductive member from the outer closure, a variable impedance connected between said conductive member and the outer closure, and measuring means within the inner closure connected in circuit with the capacitor and adapted to be connected to a voltage source and to the insulation.

8. Apparatus for testing the quality of insulation, comprising an inner conductive closure, a grounded outer conductive closure, an insulator supporting the inner closure within the outer closure, the closures thus forming a capacitor, a variable impedance outside the inner closure and in circuit between the inner closure and ground, and measuring means located within the inner closure and connected thereto and adapted to be connected to a voltage source and to the insulation.

9. Apparatus for testing the quality of insulation and adapted to be connected to a voltage source, comprising an inner conductive closure, an outer conductive closure, an insulator supporting the inner closure within the outer closure, measuring means located within the inner closure and connected thereto and adapted to be connected to one side of the voltage source, and a variable impedance located between the closures, the outer closure and variable impedance being adapted to be connected to the other side of the voltage source and forming with the inner closure a largely capacitive circuit.

10. Apparatus for testing the quality of insulation and adapted to be connected to a voltage source, comprising an inner conductive closure, an outer conductive closure, an insulator supporting the inner closure within the outer closure, the closures forming a capacitor to draw reference current from the voltage source, measuring means within the inner closure and responsive to said current, and a variable impedance located between the closures and in parallel with the capacitor for varying the phase of the reference current.

11. Apparatus for testing the quality of insulation, comprising an inner conductive closure, an outer conductive closure, an insulator supporting the inner closure within the outer closure, the closures thus forming a capacitor, measuring means located within the inner closure and connected to the inner closure, a variable impedance located between the closures and in parallel with the capacitor, and shunt means for diverting leakage current of the apparatus from the measuring means.

12. Apparatus for testing the quality of insulation, comprising a voltage source, an inner conductive closure, an outer conductive closure, the closures forming a capacitor, measuring means located within the inner closure and connected to the inner closure, a variable impedance located between the closures and in parallel with the capacitor, a dielectric structure extending between the closures, and a shunt connected to the voltage source and to the dielectric structure to supply leakage current of the structure.

13. Apparatus for testing the quality of insulation, comprising a voltage source, an inner conductive closure, an outer conductive closure, an insulated support between the inner and outer closures, the closures forming a capacitor, measuring means located within the inner closure and connected to the inner closure, a variable impedance located between the closures and in parallel with the capacitor, and a shunt connected to the insulated support and to the voltage source for supplying leakage current of the support.

14. Apparatus for testing the quality of insulation, comprising a voltage source, an inner conductive closure, an outer conductive closure, the closures forming a capacitor, measuring means located within the inner closure and connected to the inner closure, a variable impedance located between the closures and in parallel with the capacitor, an insulated control for the measuring means, the control extending through the closures, and a shunt connection between the control and the voltage source for supplying leakage current of the control.

15. Apparatus for testing the quality of insulation, comprising an inner conductive closure, an outer conductive closure electrically insulated from the inner closure, the closures forming a capacitor, measuring means located within the inner closure and connected to the inner closure, a variable impedance located between the closures and in parallel with the capacitor, and a control for the measuring means extending through the closures and substantially across the inner closure, the control being electrically insulated from the inner closure.

References Cited in the file of this patent

UNITED STATES PATENTS

| | | |
|---|---|---|
| 2,130,865 | Watts et al. | Sept. 20, 1938 |
| 2,170,813 | Doble et al | Aug. 29, 1939 |
| 2,249,862 | Skvortzoff et al | July 22, 1941 |
| 2,329,098 | Browning et al | Sept. 7, 1943 |
| 2,333,532 | Frakes et al | Nov. 2, 1943 |